No. 743,588.

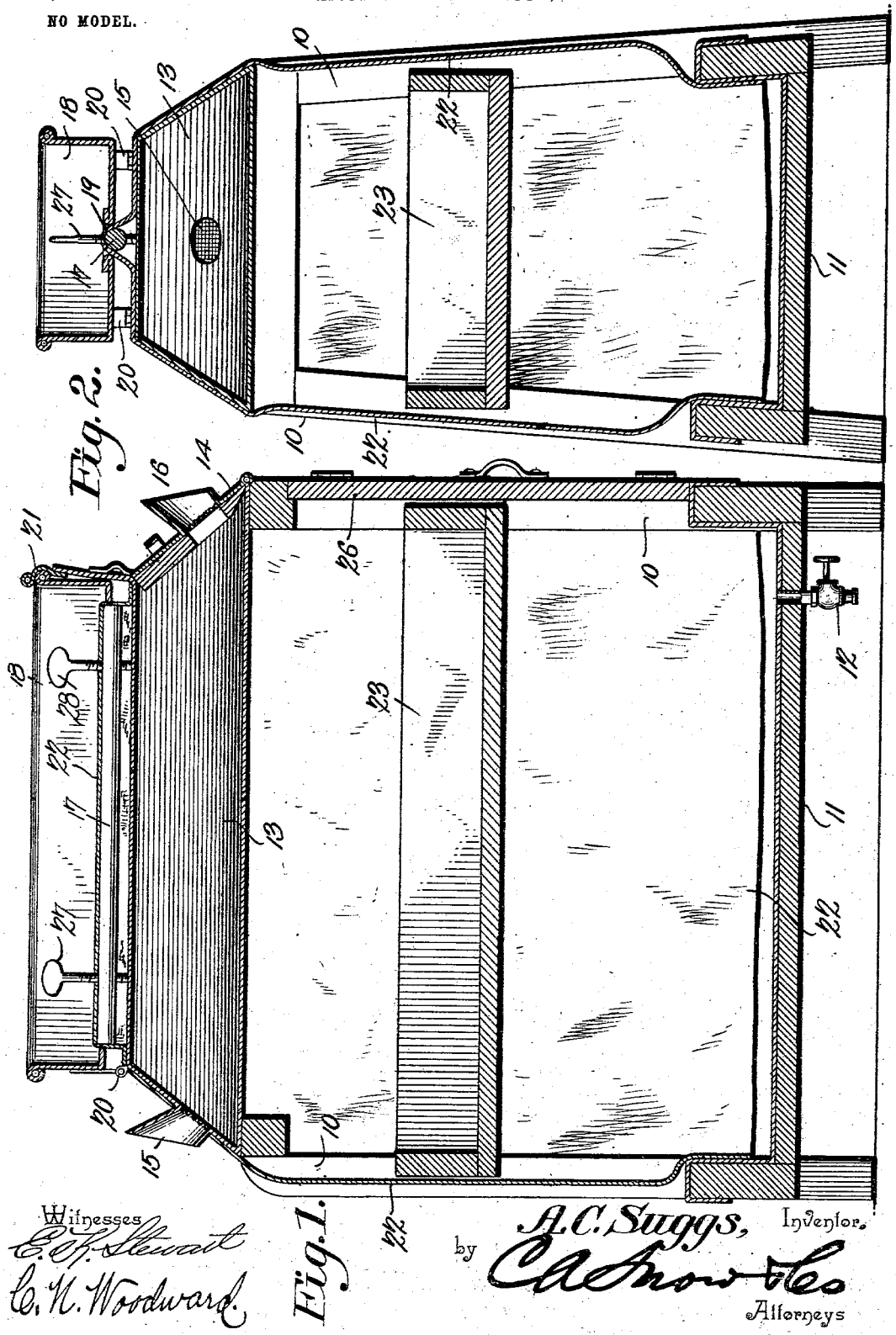

Patented November 10, 1903.

UNITED STATES PATENT OFFICE.

ALLEN C. SUGGS, OF GAIL, TEXAS.

MILK COOLER OR REFRIGERATOR.

SPECIFICATION forming part of Letters Patent No. 743,588, dated November 10, 1903.

Application filed July 6, 1903. Serial No. 164,472. (No model.)

*To all whom it may concern:*

Be it known that I, ALLEN C. SUGGS, a citizen of the United States, residing at Gail, in the county of Borden and State of Texas, have invented a new and useful Milk Cooler or Refrigerator, of which the following is a specification.

This invention relates to apparatus employed for cooling milk and similar products and which may likewise be employed for refrigerating butter and other food products, and has for its object to produce a simply-constructed and easily-operated apparatus of this character wherein the products may be cooled or refrigerated without using ice. The invention consists in certain novel features of construction, as hereinafter shown and described, and specified in the claims.

In the drawings illustrative of the invention, in which corresponding parts are denoted by like designating characters, Figure 1 is a longitudinal sectional elevation, and Fig. 2 is a transverse sectional elevation, of the apparatus complete.

The improved apparatus consists of a supporting-frame 10 of any desired size and material and supporting a receiver 11 for the milk-receptacles in its lower part, the receiver being preferably metal-lined and provided with a draw-off valve 12, as shown. The receiver will also preferably be supported above the bottom of the frame, so that the air will freely circulate beneath it.

At its upper portion the frame 10 supports a cooling-chamber 13, preferably of sheet metal, with the bottom, sides, top, and one end permanently connected and with a hinged closure 14 at the other end.

The chamber 13 will be provided with suitable ventilators, preferably in the closed end, as at 15, and in the closure 14, as at 16, the ventilators being supplied with gauze diaphragms, as shown.

The upper side of the chamber 13 is slightly conical or reversely inclined, as shown, and covering this chamber and depending downward therefrom is an envelop 22, of absorbent material, with the lower edges terminating within the receptacle 11, as shown. The envelop may be of any suitable material, such as cloth, and will be supported at all suitable points by hooks or pins and eyelets or similar easily-detachable fastening means, so that it can be readily detached for washing, and will be provided with an aperture for the ventilator 15, as shown.

Disposed above the chamber 13 is a water-tank 18, which is hinged to the chamber at one end, as at 20, and detachably supported, as by a spring-catch 21, at the other end. The tank is provided with a central longitudinal aperture 19, and disposed beneath the envelop 22 opposite this aperture is a rod 17 slightly larger than the aperture. Tapped through the rod at suitable points are adjusting-screws 27 28, extending through the aperture and terminating at their upper ends in wing-nuts, as shown, so that they can be operated from within the tank. When the tank is closed down, it will be firmly held in closed position by the hinge 20 and the catch 21 and will rest upon the rod with the screws projecting upward through the aperture in the bottom of the tank. The envelop 22, covering the rod, will be compressed between the rod and the edges of the aperture 19, the degree of compression being determined by the screws 27 28. By turning the screws the compression of the envelop may be varied to regulate the flow of water from the tank or shut it off entirely, as may be required. This is an important feature of the invention and adds materially to its value and efficiency. By this arrangement it will be obvious that when the tank is filled with water it will flow through the aperture and thoroughly saturate the cloth envelop and all surplus moisture will drain into the receiver 11, and thus be utilized to increase the supply of water in the latter, the flow being regulated, as above noted, by the valve-rod 17.

The receiver will hold the receptacles for the milk and will be supplied with water in which they will stand and may be charged from time to time by drawing off through the plug 12 and supplying fresh cooler water in addition to the drainage from the envelop 22, as above described.

Suspended within the area between the chamber 13 and receiver 11 is a tray 25 of any suitable size for supporting various articles requiring refrigeration—such as fruit, pastry, and the like—and, if preferred, a plurality of these trays may be employed.

One end of the framework will be provided with a hinged closure 26, which will afford access to the whole interior below the cooling-chamber, including the trays and receiver, as shown. Suitable bearing-handles may be attached; but as these form no part of the invention they are not illustrated. By this simple means the well-known cooling properties of a diaphragm of moistened material will be utilized to maintain the air within the envelop at a temperature sufficiently low to efficiently refrigerate milk, butter, and other products and material requiring such treatment at small expense and without the use of ice.

The device may be constructed in any size or capacity and otherwise modified in minor particulars without departing from the principle of the invention or sacrificing any of its advantages.

Having thus fully described my invention, what I claim is—

1. In an apparatus of the character described, a supporting-frame, a receiver for the milk-receptacles in the lower portion of said frame, a cooling-chamber adapted to serve as a container for liquids supported at the upper portion of said frame and provided with ventilators in its opposite ends, an envelop of absorbent material inclosing said chamber and extending to said receiver and forming an inclosure between said receiver and chamber, a tank for the cooling liquid, and means whereby the liquid in said tank is supplied to said absorbent envelop, substantially as described.

2. In an apparatus of the character described, a supporting-frame, a receiver for the milk-receptacles in the lower portion of said frame, a cooling-chamber supported at the upper portion of said frame and provided with a ventilator at one end and a movable closure at the other end with a ventilator in said closure, an envelop of absorbent material inclosing said chamber and extending to said receiver and forming an inclosure between said receiver and chamber, a tank for the cooling liquid, and means whereby the liquid in said tank is supplied to said absorbent envelop, substantially as described.

3. In an apparatus of the character described, a supporting-frame, a receiver for the milk-receptacles in the lower portion of said frame, a cooling-chamber supported at the upper portion of said frame, an envelop of absorbent material inclosing said chamber and extending to said receiver and forming an inclosure between said receiver and chamber, a tank having an aperture through its bottom, a stop member disposed between said cooling-chamber and absorbent envelop and opposite said aperture, adjusting-screws disposed to compress said stop member and envelop material against said tank adjacent to said aperture, substantially as described.

4. In an apparatus of the character described, a supporting-frame, a receiver for the milk-receptacles in the lower portion of said frame, a cooling-chamber supported at the upper portion of said frame, an envelop of absorbent material inclosing said chamber and extending to said receiver and forming an inclosure between said receiver and chamber, a tank having an aperture through its bottom and hinged by one end to said chamber and yieldably supported at the other end, and a stop member disposed between the cooling-chamber and absorbent envelop and opposite said aperture, and means for compressing said stop member and the portion of absorbent material thereover against said tank adjacent to said aperture, substantially as described.

5. In an apparatus of the character described, a supporting-frame, milk-holding devices supported in said frame, a tank supported above said milk-holding devices and having a slot in the bottom thereof, a rod arranged beneath the slot, an envelop for the milk-holding devices extending over said rod, and means for adjusting the position of said rod to vary the compression of the envelop between the rod and the margins of the slot in the bottom of the tank.

6. In an apparatus of the character described, a supporting-frame, milk-holding devices supported in said frame, a tank at the top of said frame having a slot in the bottom, a rod beneath said slot of somewhat greater diameter than the width of the slot, screws adjustably supporting said rod, and an envelop of absorbent material inclosing said milk-holding devices and extending over said rod in position to be compressed between the rod and the edges of the slot in the bottom of the tank.

In testimony that I claim the foregoing as my own I have hereto affixed my signature in the presence of two witnesses.

ALLEN C. SUGGS.

Witnesses:
A. B. SPEARS,
T. W. HALE.